Patented Jan. 9, 1945

2,367,131

UNITED STATES PATENT OFFICE 2,367,131

CITRUS JUICE POWDER AND METHOD OF MAKING SAME

Herbert T. Leo and Clarence C. Taylor, Anaheim, Calif., assignors to Mutual Citrus Products Company, Anaheim, Calif., a corporation of California No Drawing. Application December 22, 1941, Serial No. 423,955

10 Claims. (Cl. 99—206)

This invention relates to a citrus juice powder containing sugars such as dextrinized glucose which may be redissolved in water to yield a juice product having the permanently cloudy appearance of the common citrus fruit beverages. The invention also pertains to a method of making such powder by spray drying.

Citrus fruit juices normally contain enzymes that precipitate pectin from solution. These enzymes may be rendered inactive by the addition of sulfur dioxide. On spray drying, such added sulfur dioxide is liberated, and when the resulting spray dried citrus fruit powder is dissolved in water, the solution obtained will contain pectin enzymes whose activity is no longer inhibited by the presence of sulfur dioxide, for conventional spray drying temperatures do not destroy pectin enzymes.

Mere spraying of citrus juices containing sulfur dioxide will therefore yield a product which when redissolved in water will, even if initially cloudy, soon lose its cloudiness due to precipitation of the pectin. As a matter of fact, citrus juices normally contain an amount of pectins and other colloidal clouding agents insufficient for the preparation of cloudy citrus beverages. We have found that dextrin containing preparations such as corn syrup may be added to citrus juices wherein they act as auxiliary clouding agents as long as they remain in colloidal solution. But if so added, dextrinized glucose or the like will remain in colloidal state only as long as the pectin present in the juice is not precipitated.

A particularly valuable constituent of lemon juice is vitamin C or ascorbic acid. However, the vitamin C content of lemon juice is subject to deterioration on storage.

It is an important object of the present invention to provide a method of destroying pectin enzymes normally present in citrus fruit juices to be spray dried, whereby the spray dried product may be redissolved in water to yield an enzyme free product containing permanently dissolved pectin capable of acting as a clouding agent, in particular, in combination with dextrinized glucose.

Another important object of this invention is to provide a citrus juice powder containing dextrinized glucose or the like which on solution yields a product containing colloidal dextrinized glucose.

A further object of this invention is to provide a citrus juice powder having a stable vitamin C content.

Other and further objects of this invention will become apparent from the following description and appended claims.

The citrus fruit juices used as starting material for the processes according to the present invention may be hand or machine reamed, crushed or squeezed from the fruit. Depending on the particular method used, more or less oil is incorporated with the juice, as is also a certain amount of liquid from the peel. Any type of juice, however, may be used. The fruit pulp or other suspended solids are suitably removed by centrifuges, by screens, or otherwise, to prevent clogging of the spray nozzles. When a juice containing oils is centrifuged, most of this oil is also removed.

Such juices are heat treated to destroy pectin enzymes present therein. We have found that in heat treating juices for this purpose it is essential to avoid insufficient treatment because a mere trace of an enzyme can destroy large quantities of juice. We have found that some enzymes can convert as much as 250,000 times their own weight, acting as catalysts, the extent of destruction being limited only by the time of action. In other words, a mere trace of enzyme may over a long period of time do as much harm as a large quantity of enzyme can do in a short period of time. The methods of this invention, however, destroy with certainty all enzymes present in the citrus juice being treated.

Citrus fruit juices vary greatly as to pH values, and sugar and acid content. As in the case of bacteria and other microorganisms, various pH values affect the results of heat treatments with respect to enzyme destruction. Thus it is known, for instance, that heating for as long as one hour at 250° F. may be necessary to kill certain spores in vegetables having a pH of 7, while in juices having pH values of 2.50, a temperature of 180° F. maintained for five minutes will do the same work.

We have found that a temperature of 200° F. and a period of treatment of five minutes will kill all enzymes of all types in citrus fruit juices. Ten minutes at 200° F. is an upper limit beyond which too great changes in flavor value are brought about.

The flow of citrus juice in a conventional flash pasteurizing unit through a heated pipe directly into a cooled pipe, to effect rapid cooling, does not insure complete destruction of all enzymes. We have therefore invented a more efficient method comprising bringing the temperature of the juice to 200° F. in a conventional tubular pasteurizer and conducting the heated juice to a tank provided with an agitator. The rate of flow of juice through the pasteurizer and the capacity of each of the tanks (preferably at least three tanks are provided) should be such that each tank will be filled in less than five minutes. The heated juice is then kept in the tanks for five minutes or less, the agitators being kept moving as long as there is any juice in any tank.

The juice is thereafter cooled. Since the juice is to be spray dried, we prefer to cool by exposing the juice to vacuum rather than by heat exchange. In this manner the heat contained in the juice is utilized to concentrate and thereby to dry the juice. For this purpose the juice is sucked through a small nozzle into a vacuum chamber so constructed that the vapors evolved may be condensed outside the chamber. Further concentration may be desirable. For instance, in a batch to include 220 gallons of straight juice and, to be admixed therewith as disclosed hereinbelow, dextrinized glucose in an amount such as 80 gallons, it may be desirable to reduce the volume of the juice to 100 gallons before mixing. The capacity of the spray nozzle of the dryer to bring about effective atomizing and quick drying of more highly concentrated products limits the extent of concentration found practical. Some further concentration, however, is usually desirable.

Before spray drying, dextrinized glucose is suitably added to the pasteurized and concentrated citrus juice in the form of corn syrup in an amount such that the spray dried powder will contain, on an average, 82 per cent corn syrup solids and 18 per cent citrus juice solids. The spray dried powder should not contain more than 1 per cent moisture.

The dextrinized glucose that we prefer to use is known in the trade as "low purity" and "low fermentable." It is usually 43° Baumé and contains between 83 and 85 per cent solids. The reducing sugars generally amount to between 26 and 28 per cent on a dry basis. This product thus contains a large percentage of dextrines in various stages of change.

To produce a powder containing the above disclosed 82 to 18 ratio of corn syrup to fruit juice solids, we find it suitable to employ 220 gallons of straight lemon juice or 265 gallons of straight orange juice together with 80 gallons of glucose.

For best flavor, the citrus juices should be cooled before dextrinized glucose or the like is added. It is not necessary to heat the syrup resulting from the addition of dextrose to fruit juices before the syrup is spray dried.

An oil flavor such as orange or lemon may optionally be incorporated with the syrup about to be spray dried. Such oil is emulsified with gum acacia or other gum treated according to the methods disclosed in the copending applications of Herbert T. Leo, Clarence C. Taylor and John W. Lindsay entitled "Method of treating gum solutions and product made thereby." One pound of oil is emulsified with sufficient treated gum acacia solution to make one gallon of emulsion. From one quart to one gallon of such emulsion may be added to 50 gallons of syrup ready to be spray dried.

A typical beverage recipe using a citrus powder made from lemon juice with one quart lemon oil emulsion per 50 gallons of syrup is the following:

*Lemonade (20 gallons)*

| | |
|---|---|
| Lemon juice powder _____ pounds__ | 5 |
| Hot water _____ gallons__ | 3 |
| Sugar _____ pounds__ | 10 |
| Iced water _____ to make 20 gallons | |

The hot water is placed in a container and the lemon juice powder is added. The mixture is stirred until the powder is dissolved. When the powder is completely dissolved, the sugar and the cold water are added and stirring is continued until the solids are completely dissolved.

In such a formula one quart of emulsion is sufficient to give an excellent lemon flavor. In recipes using more emulsion, citric acid and more sugar and water must be used. Since the powdered lemon juice contains approximately 13 per cent natural citric acid, the proper amount of emulsion to be used in any desired beverage formula is easily computed. The same methods are used for orange and lime beverages. Color, of course, may be incorporated with the syrup before spraying or with the spray dried powder.

The spray dried product prepared as disclosed hereinabove is a snowy white powder which redissolves easily in water to give a cloudy beverage that retains its cloud practically indefinitely, for the heat treatment described hereinabove destroys all the pectin enzymes in the juices regardless of the pH values or solids concentration prevailing in the juices. Of course, if enzymes are introduced into beverages prepared from the powdered products of this invention, for instance, by the addition of emulsions prepared with gums containing enzymes such as pectinase or oxidase, then the pectin and, along with it, dextrinized glucose and other colloidal clouding agents will be precipitated.

The citrus fruit powders according to this invention may also be used as clouding agents for citrus beverages prepared directly from citrus fruit juices.

The spray dried powder can be produced as a uniform product that keeps well. The powdered citrus juices adsorb moisture and should preferably be kept in hermetically sealed containers. Friction top tins are excellently adapted for this purpose. The powder keeps best when the air introduced into the containers along with the citrus powder is replaced with carbon dioxide. Such replacement, while desirable, is not essential.

All citrus juices contain vitamin C or ascorbic acid as a very valuable constituent. Ascorbic acid oxidizes readily in solution. We have found sulfur dioxide very effective to prevent oxidation of the ascorbic acid in the syrup prior to spray drying. Three ounces sodium bisulfite added to each 50 gallons of syrup is enough to preserve the vitamin C content thereof for months. Of course, no colors should be added to a syrup containing sodium bisulfite that are reduced by sulfur dioxide.

When syrup containing sodium bisulfite or sulfur dioxide is spray dried, the sulfur dioxide is removed along with the water. Only traces remain in the powder that are insufficient to preserve the ascorbic acid content thereof, which is not destroyed by spray drying. We have found, however, that iso ascorbic acid, when added before or after spray drying, acts, when the spray dried powder is redissolved, as an antioxidant to preserve or stabilize the vitamin C or ascorbic acid present in beverages prepared from the spray dried powder.

Various details of process and composition may be varied within a wide range without departing from the principles of this invention, and it is, therefore, not our intention to limit the patent granted on this invention otherwise than necessitated by the scope of the appended claims.

We claim as our invention:

1. A citrus juice powder free of pectin enzymes and containing corn syrup solids.

2. A method of preparing a citrus juice powder free of enzymes comprising subjecting a citrus juice to a heat treatment falling within the intensity range having as a lower limit a heat treatment at 200° F. for 5 minutes and as an upper limit a heat treatment at 200° F. for 10 minutes, adding corn syrup solids to the heat treated juice and spray drying the resulting mixture.

3. A method of preparing a citrus juice powder free of pectin enzymes comprising heating citrus juice at 200° F. for from 5 to 10 minutes, immediately thereafter cooling the juice, adding corn syrup to the cooled juice and spray drying the resulting mixture.

4. A method of preparing a citrus juice powder free of pectin enzymes comprising heating citrus juice at 200° F. for from 5 to 10 minutes, immediately thereafter exposing the juice to a vacuum so as to cool the same, adding corn syrup to the cooled juice and spray drying the resulting mixture.

5. A method of preparing a citrus juice powder which comprises subjecting a citrus juice to a heat treatment sufficient to free said juice of pectin enzymes, adding corn syrup to the heat treated juice and spray drying the resulting mixture.

6. A method of preparing a lemon juice powder which comprises subjecting lemon juice to a heat treatment sufficient to free said juice of pectin enzymes, adding corn syrup to the heat treated juice and spray drying the resulting mixture.

7. A lemon juice powder free of pectin enzymes and containing corn syrup solids.

8. A method of preparing a lemon juice powder free of enzymes comprising subjecting lemon juice to heat treatment falling within the intensity range having as a lower limit a heat treatment of 200° F. for 5 minutes and as an upper limit a heat treatment of 200° F. for 10 minutes, adding corn syrup to the heat treated juice and spray drying the resulting mixture.

9. A method of preparing a lemon juice powder free of pectin enzymes comprising heating lemon juice at 200° F. for from 5 to 10 minutes, immediately thereafter cooling the juice, adding corn syrup to the cooled juice and spray drying the resulting mixture.

10. A method of preparing a lemon juice powder free of pectin enzymes comprising heating lemon juice at 200° F. for from 5 to 10 minutes, immediately thereafter forcing the juice through a vacuum so as to cool the same, adding corn syrup to the cooled juice and spray drying the resulting mixture.

HERBERT T. LEO.
CLARENCE C. TAYLOR.